N. D. CHARD.
LATHE.
APPLICATION FILED SEPT. 22, 1909.
1,121,068.
Patented Dec. 15, 1914.
2 SHEETS—SHEET 1.
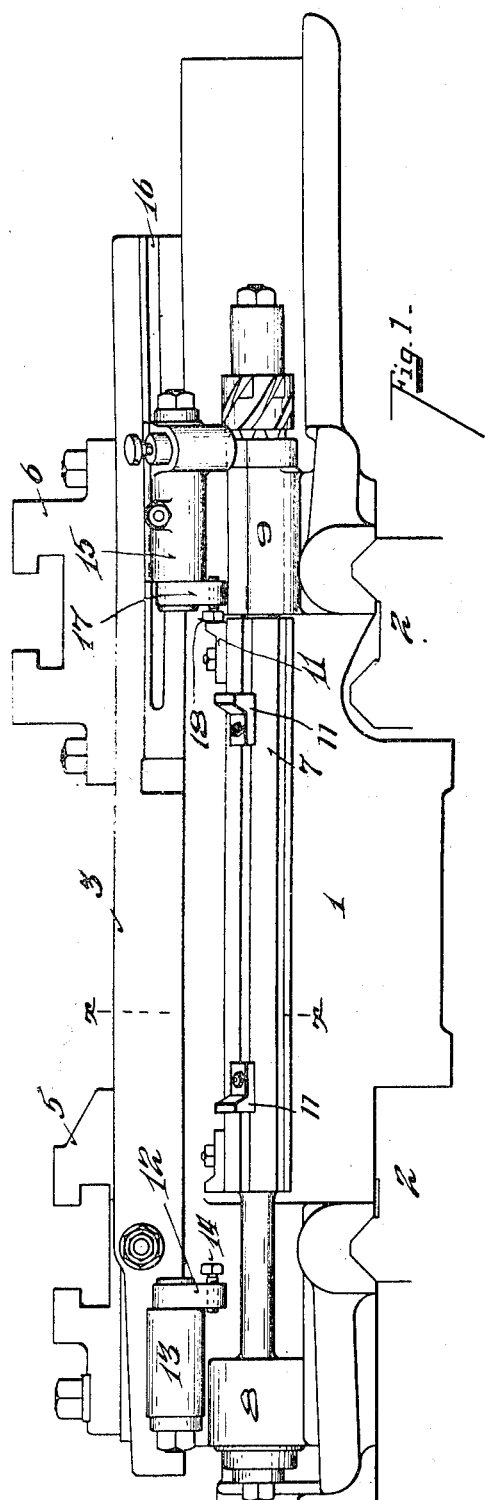
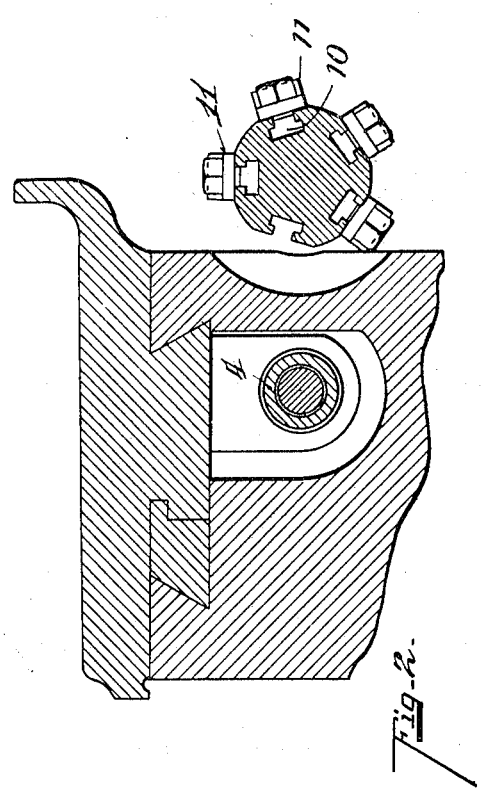
Witnesses
Oliver B. Kaiser
Emma Spener
Inventor
Nicholas D. Chard
By Wood & Wood
Attorneys N. D. CHARD.
LATHE.
APPLICATION FILED SEPT. 22, 1909.
1,121,068.
Patented Dec. 15, 1914.
2 SHEETS—SHEET 2.
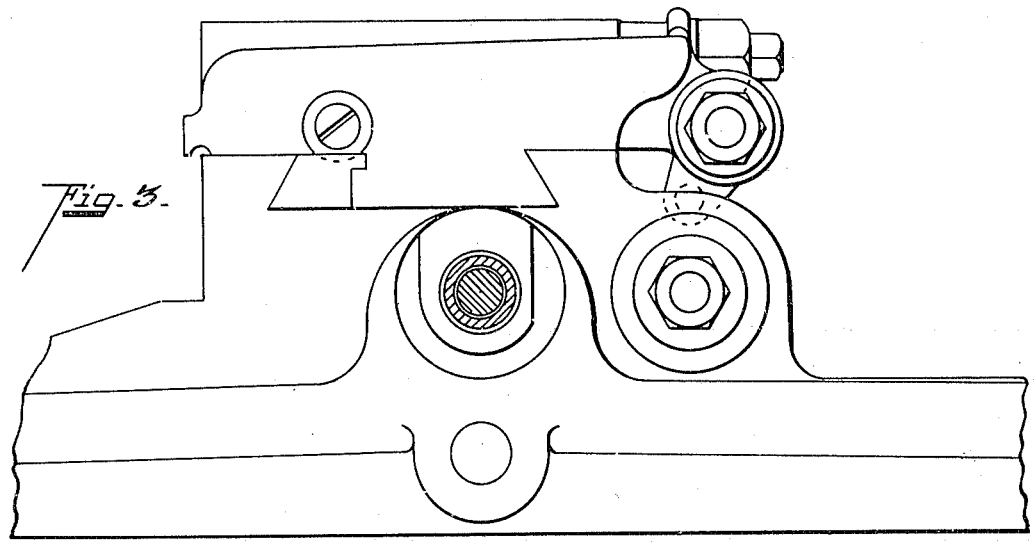
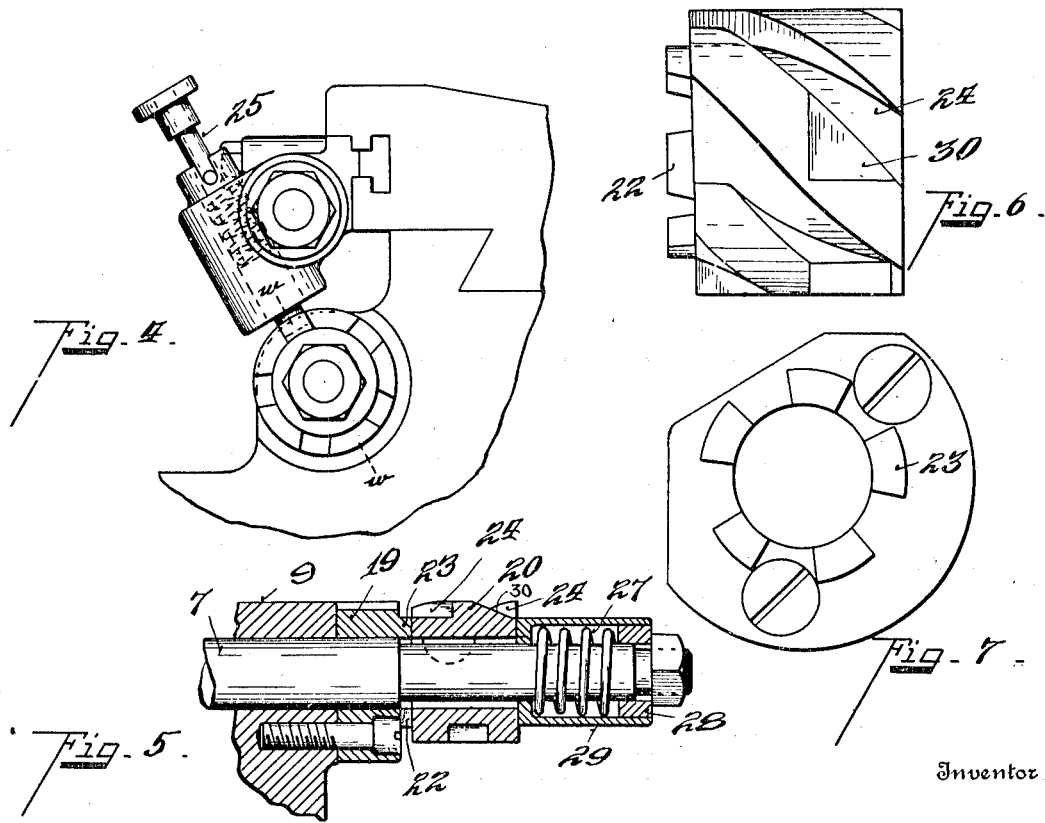
Witnesses
Inventor
Nicholas D. Chard
By Wood & Wood
Attorneys

UNITED STATES PATENT OFFICE.

NICHOLAS D. CHARD, OF CINCINNATI, OHIO, ASSIGNOR TO THE LODGE & SHIPLEY MACHINE TOOL CO., OF CINCINNATI, OHIO, A CORPORATION.

LATHE.

1,121,068.  Specification of Letters Patent.  Patented Dec. 15, 1914.

Application filed September 22, 1909. Serial No. 519,027.

*To all whom it may concern:*

Be it known that I, NICHOLAS D. CHARD, a citizen of the United States, residing at Cincinnati, in the county of Hamilton and State of Ohio, have invented certain new and useful Improvements in Lathes, of which the following is a specification.

My invention relates to means for governing the cross feed of a tool slide for machine tools.

The object of my invention is to provide a carriage of a machine tool with means whereby the tool holding slide is governed in its cross feed movement and arrested in its travel, so as to bring the tool accurately to a predetermined distance from the axial line of the tool centers.

Another object of my invention is to provide a lathe carriage, with means provided with a series of adjustable stops for limiting the movement of the tool-holding slide upon the carriage, with means for shifting the stops through the action of the slide in one direction of its travel for serially presenting the stops in the path of slide travel.

Another object of my invention is to provide means for automatically governing the cross feed movement of the tool holding slide of machine tool for presenting the cutting tool within various limits relatively to the axial line of the work holding center.

Another object of my invention is to provide a lathe carriage with a cross feed slide carrying a multiple of tool holders, and means for governing the movement of the tool holding slide in either direction of its travel to automatically gage the depth of cut of the cutting tools.

Another object of my invention is to provide a lathe carriage and tool holding slide, with means for arresting the movement of the slide feed in either direction, and automatically changing such limit of movement upon a reverse feed of the tool slide for a second operation.

The features of my invention are more fully set forth in the description of the accompanying drawings, forming a part of this specification, in which:—

Figure 1 is a side elevation of the lathe carriage and tool holding slide with my improvement applied. Fig. 2 is an enlarged section on line $x$, $x$, Fig. 1. Fig. 3 is a front elevation of carriage and tool holding slide, illustrated in Fig. 1. Fig. 4 is a rear elevation of a portion of the same. Fig. 5 is a section on line $w$, $w$, Fig. 4. Fig. 6 is a detailed elevation of one of the shifting members. Fig. 7 is a detailed end elevation of one of the shifting clutch members.

As illustrated, my invention is applied to a carriage and tool-holding slide of an engine lathe, but it is obvious that the same can be applied to various machine tools.

The essential features relate to gaging the feed of the cutting tool relative to the work for governing its cut and when employed upon the lathe enables the turning of the work to a given diameter without stopping the machine for manually gaging the work, the tool and its holding slide being brought into engagement with a stop when fed its required distance for turning a given diameter, and as illustrated a series of stops are provided, which stops are automatically shifted to provide various limits of carriage feed.

1 represents a lathe carriage slidably mounted in the usual manner, upon the rail 2 of the bed.

3 represents the tool holding slide, slidably mounted upon the carriage in the usual manner, and fed in its cross feed by means of a screw 4, likewise accomplished in any well-known manner. As illustrated in Fig. 1, the tool slide 3 is provided with the tool holders 5, 6, one adjustable transversely upon the slide, while the other is adjustable parallel with the slide. While I have shown two tool holders, one for turning the work from the forward position thereof, the other for turning the work from the rear thereof, it is obvious that only one tool-holder may be employed, without departing from the features of my invention.

The carriage slide and holders may be of any conventional design employed in lathes, and does not form a part of this invention, except in so far as the application or manner of supporting my improved gage mechanism relatively thereto.

While I have illustrated some of the parts of my improvement as integrally formed, with the carriage or slide, it is quite obvious that the same could be readily constructed, so as to adapt the same to be connected to any conventional design of lathe carriage and slide. 7 represents a stop-supporting arbor, journaled in the bearings 8, 9. The arbor is preferably of polygonal form providing a series of plane longitudinal faces each having a T-slot 10 for adjustably securing the stops 11 upon the faces. The stops are the same distance from the center of the arbor as stop elements projecting from the tool element so as to relatively engage when selectively alined.

12 represents a stop-arm supported in the bracket 13, extending from the tool-holding slide 3. Said arm is provided with a set screw 14, upon the free end of the stop-arm, adapted to engage with one of the stop-dogs 11 for limiting the forward movement of the tool-slide.

15 represents a sleeve bracket adjustably mounted on the tool-holding slide 3, along a T-slot 16. 17 represents a stop-arm, supported by said bracket 15, with its free end provided with an adjustable stop-screw 18, adapted to engage one of the stops 11 in the rearward movement of the tool-holding slide. The stop-arms 12 and 17 can be swung upward out of the path of stop-dog engagement when not in use. In certain classes of work, in which it is desirable to turn the same with several diameters, I have provided means for automatically shifting the dog supporting arbor 7, to bring a second set of dogs in the path of stop-arm travel, to be engaged thereby, for producing a second limit of slide feed in either direction.

19 represents a clutch sleeve, fixed to the bracket 9, see Fig. 5.

20 represents a cam sleeve splined upon the arbor 7, said cam sleeve being provided with clutch teeth 22, adapted to engage between the clutch teeth 23, projected from the lock sleeve 19. Said cam sleeve is provided with a series of helical grooves 24, see Fig. 6, equal in number to the T-slots formed in the dog supporting arbor.

25 represents a spring actuated detent, supported in the bracket 15, traveling with the slide and adapted to engage within a respective alined helical groove 24, of the cam sleeve 20, moving the same endwise upon the arbor, disengaging the clutch teeth 22, 23, releasing the arbor, permitting the same to be revolved through the further action of the detent 25, upon the helical surface of a groove 24, rotating the same, and as it is splined and keyed with the arbor, it likewise will be rotated. Such rotative action being maintained until the detent travels out of the helical groove, when the cam sleeve 20 will be automatically moved into its normal position, with its clutch teeth thrown into engagement with the clutch teeth of the lock sleeve, by means of a spring 27. One end of the spring 27 bears against a collar 28, abutting a nut upon the arbor, while the opposite end of the spring is adapted to exert pressure against the cam sleeve 20.

29 represents a housing sleeve for incasing the spring 27, its free end sliding over collar 28. In a rearward feed of the tool-holding slide, the detent will engage a relatively alined inclined way 30, of the cam sleeve 20, and pass over the same, so as to permit a free passage of the slide in its return feed, without disturbing the position of the slide stop mechanism.

The set screws 14 and 18 are provided for delicately adjusting the distance of travel between them and their coöperating dogs, and also serve for conveniently resetting the mechanism, after a removal of the cutting tool for grinding, so as to accurately gage the given various limits of travel for the series of dogs employed, without necessitating a readjusting of the dogs.

Having described my invention, I claim:—

1. In a machine of the class described, a traveling carriage, a tool holding slide movable thereon, means mounted on the carriage provided with a series of adjustable stops adapted to be projected in the path of slide travel for arresting the slide at predetermined limits of travel, means on said slide adapted to engage said carriage stops and means operated by said slide in one direction of its movement to change the limit of slide travel by shifting the carriage stops to present a different one in the path of slide travel.

2. In a machine tool of the class described, a carriage, a tool holding slide mounted thereon, stops mounted on said slide, an arbor supported upon the carriage parallel with the slide, a fixed clutch member mounted on the carriage, a movable clutch member splined on the arbor, provided with means adapted to engage with one of said stop members to disengage the clutching engagement, and revolve the arbor, stop members on the periphery of said arbor, adapted to be adjusted in the path of slide stop travel, enabling differential limits to be automatically presented by the movement of the slide.

3. In a machine tool, a carriage, a tool slide thereon, a stop supporting arbor journaled upon said carriage and parallel therewith, coacting clutch members, one fixed upon the carriage and the second upon the arbor adapted when engaged to lock the arbor in its rotation, and means mounted on said slide adapted to engage with said movable clutch member to release the arbor and rotate the same upon one feed movement of said slide, and means projecting from said slide adapted to engage with said stop supporting arbor at predetermined limits of slide movement.

4. In a machine of the class described, a carriage, a tool holding slide movable upon the carriage, a rotatable arbor supported longitudinally parallel to the movement of the slide, stop elements projecting therefrom adapted to be engaged by the slide, to limit its forward and reverse movements, a slidable and rotatable member mounted on the arbor having cam formations upon its periphery adapted to be engaged by the slide to rotate said member and arbor, to position a second set of stop elements in the path of the slide, to be engaged thereby.

5. In a machine of the class described, a carriage, a tool holding slide movable upon the carriage, a rotatable arbor supported longitudinally parallel to the movement of the slide, stop elements projecting therefrom adapted to be engaged by the slide, to limit its forward and reverse movements, a lock element, a slidable and rotatable member normally engaged with said lock element, and mounted on the arbor, provided with cam formations, adapted to be engaged by the slide, to slide said member for lock disengagement and arbor rotation, to position a second set of stop elements in the path of the slides to be engaged thereby 6. In a machine of the class described, a traveling carriage, a tool holding slide movable thereon, a rotatable stop supporting member supported parallel to the movement of the slide, a series of stops projected therefrom adjustable relative to the travel of the slide, coöperative elements mounted upon said slide and stop supporting member adapted to engage with each other in one direction of movement of the slide to shift said stop supporting member to position one or more of said stops of the series into and out of the path of slide travel to control the limits of movement of said slide.

7. In a machine of the class described, a movable slide member, a stop member supported parallel with said slide member having a series of stop elements radiating therefrom, coöperative elements mounted upon said slide and stop supporting member, adapted to engage with each other during the movement of the slide, to shift said stop supporting member to bring one or more stops into a position to be engaged by the slide to define its limits of movement.

8. In a machine of the class described, a movable slide, a stop member having a series of stop elements radiating therefrom with each stop adapted to be positioned in the path of slide movement to be engaged thereby, coöperative elements mounted upon said slide and stop supporting member respectively, the one on the stop supporting member being adapted to normally lock said stop supporting member against movement, and released and rotated by said slide element to shift the stop supporting member to change the position of its stop elements, whereby various limits of slide movement may be presented and automatically controlled by the movement of the slide.

9. In a machine of the class described, a movable tool slide, a stop supporting arbor journaled adjacent to the slide, coacting members, one mounted rigidly independent of the arbor, the second upon the arbor, adapted when engaged, to lock the arbor, and means mounted on said slide adapted to engage with said arbor member to release its locking engagement and rotate the same during a predetermined interval of slide movement, stop elements projecting from said arbor adapted to be positioned by the movement of the arbor to bring the same into and out of a slide engaging path to control predetermined limits of slide movement.

10. In a machine of the class described, a slide member, a stop supporting member rotatively journaled and having adjustable stops adapted to engage with said slide member, coacting members the one mounted against rotation, the second upon the stop supporting member, adapted to engage with each other to lock said stop supporting member against rotation, coöperative elements, one movable with the slide, for releasing the locking engagement of said coacting members, and shift said stop supporting member to position its stop element into and out of a slide engaging path.

11. A machine of the class described combining a slide member, a rotatable stop member supported parallel with the direction of travel of said slide to confine the slide travel, and coöperating elements, one concentrically connected with the stop member and the second rigidly located on the slide, said elements adapted to coöperate during an interval of slide travel to rotate the stop member to change the slide confining limits of travel.

12. In a machine of the class described, a slide member, a stop member parallel with the travel of the slide member, adapted to engage the same to limit the slide movement, coöperative elements, one movable with the slide, and the second stationary relative thereto, rotatable and in connection with said stop member, said elements adapted to be engaged during an interval of slide travel to impart a rotary movement to said stop member to divert its relative slide stop engagement.

13. A machine of the class described combining a lathe tool slide, a rotatable stop member disposed adjacent to the slide parallel with its line of travel to limit the slide travel, a plurality of adjustable stops radiating diametrically from said stop member, one thereof adapted to be positioned to be engaged by said slide and limit its motion.

14. The combination with a lathe having a tool slide thereon provided with a stop, of a transverse shaft having a plurality of adjustable stops arranged concentrically around the same and being at the same distance from the center of the shaft as said stop on the slide, whereby at different positions of the shaft one of the stops will be in position to engage said stop on the slide and limit the motion of the slide.

15. The combination with a lathe having a tool slide thereon provided with a projection having a stop of a rotatable transverse shaft having a plurality of adjustable stops arranged concentrically around the same being at the same distance from the center of the shaft as said projection stop, certain of said stops being in position to limit the position of the slide rearwardly and others to limit its position forwardly.

In testimony whereof, I have hereunto set my hand.

NICHOLAS D. CHARD.

Witnesses:
OLIVER B. KAISER,
EMMA SPENER.